Oct. 26, 1926.

E. E. PLUMLEY

GAUGE

Filed August 16, 1924

E. Earl Plumley, Inventor
By his Attorney
Ivan E. A. Konigsberg

Patented Oct. 26, 1926.

1,604,238

UNITED STATES PATENT OFFICE.

ELI EARL PLUMLEY, OF RICHMOND, VIRGINIA.

GAUGE.

Application filed August 16, 1924. Serial No. 732,374.

This invention relates to a gauge for measuring automobile cylinders for new piston rings for repair purposes.

When an automobile has been in use for some time, it becomes necessary or desirable to replace the worn piston rings with new rings. The new rings to be used depend upon the diameter of the cylinder and the extent to which it has worn (together with the wear on the original piston rings).

In ordering the new rings, the repairer, therefore, must first measure the worn cylinder, determine the size of the cylinder (either from figuring and measuring, or from other data) and thereafter figure the size, usually called oversized, piston rings required.

It is obvious that in a matter of this kind, the greatest accuracy is required, because, if the correct oversize piston ring is not obtained for the particular job, a great deal of trouble and inconvenience as well as expense follows.

The particular object of this invention is to provide a gauge whereby the repairer in a single operation and by the use of the gauge may at once obtain or read the figure of the oversize piston ring required for the particular job in hand.

In conection herewith it is to be remembered that automobile cylinders are made in certain standardized sizes, and likewise, the oversize piston rings are made in certain standardized sizes and these two known facts are utilized in accomplishing the object of this invention.

In carrying out my invention I provide a gauge which may be set to any one of the standard sizes of automobile cylinders before inserting the gauge in the cylinder. After the gauge has there been inserted, I provide means for measuring the actual diameter of the worn cylinder and in these means I provide a telltale scale, which informs the repairer of the size of the oversized piston rings to order for that particular cylinder.

The use of my gauge is very easy and simple to understand, the operation is carried out very quickly and the result is definite and certain. All mental calculations and figuring or the reading of tables, lists or catalogues is eliminated.

Accordingly, my invention is embodied in a gauge arranged and constructed as hereinafter set forth and as illustrated in the accompanying drawing in which—

Figure 1:
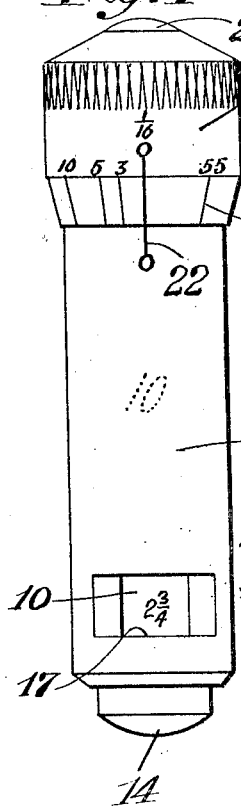
Figure 1 is an enlarged outside view of a gauge embodying my invention.
Figure 2:
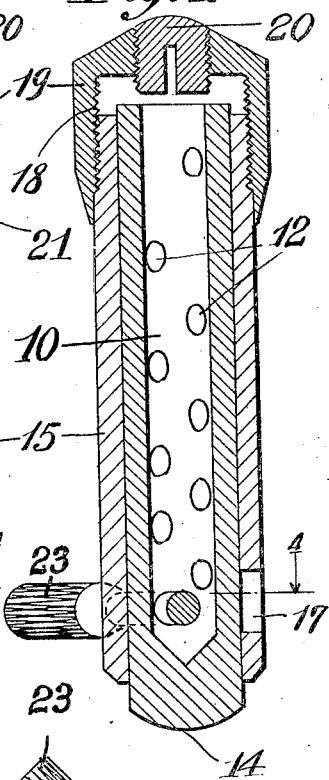
Figure 2 is a sectional view of the gauge.

Referring to the drawing the reference numeral 10 denotes a plunger, preferably hollow, and provided with a plurality of holes 12 spaced circumferentially and longitudinally on said plunger in a certain given relation to the tip 14 of the plunger.

The plunger 10 is adapted to slide within a sleeve 15 which is provided with a single hole 16 and a window or opening 17.

The opposite end of the sleeve 15 is screw-threaded as at 18 and on it is screwed a thimble 19 which has an adjustable tip 20, and on the outside of which there is a micrometer scale 21 to be read with relation to a zero mark 22 on the sleeve 15.

Figure 3:
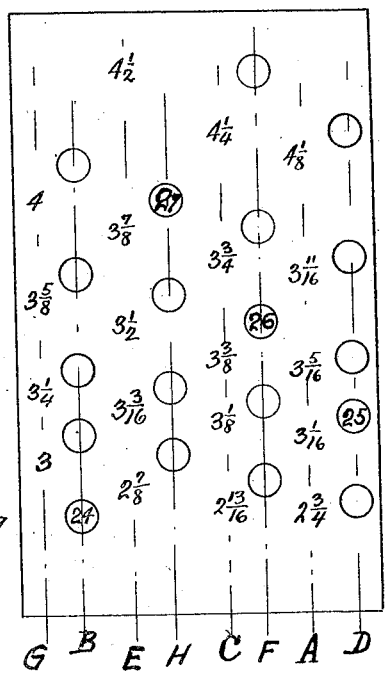
Figure 3 is a diagram illustrating the development of that part of the gauge which refers to the standard cylinder dimensions.

It has been noted in the foregoing and is a matter of general knowledge in the art, that automobile cylinders are manufactured with certain predetermined diameters, which as indicated in Figure 3, run from the smallest diameter of two and three-quarter inches to the largest of four and one-half inches diameter.

The holes 12 in the plunger 10 are so spaced that when any one of the diameter readings thereon appear in the window 17 in the gauge as in Figure 1, the distance between the ends of the tips 14 and 20 is exactly equal to that indicated by the figure to be read through said window. Thus in the drawing, which is very much enlarged, the outside length measured by the gauge in Figure 1 is two and three-quarters inches.

In order to measure a cylinder, the repairer first sets the scale 21 at zero and then adjusts and sets the gauge to the standard diameter of the cylinder to be measured by sliding and rotating the plunger 10 within the sleeve 15 until the desired reading appears in the window 17, after which he fixes the adjustment of these two members, 10 and 15, in immovable relation by inserting a pin 23 through the hole 16 in the sleeve and into the hole 12 in the plunger 10, which hole 12 will be found to be in the proper position to match the hole 16 when a certain reading appears in the window 17.

An inspection of Figure 3 shows that when any one of the readings in line A appears in the window 17, the corresponding holes in line B will match the hole 16 in the sleeve. Similarly, when any one of the readings in line C appears in the window, the proper corresponding hole in line D will match the hole 16 (passing from right to left around the illustration in Figure 3 as will be understood). When any one of the readings in line E appear in the window 17, the proper corresponding hole in line F will match the hole 16 in the sleeve. Similar for the readings in line G which belong to the holes in line H.

To illustrate: When the reading 2¾ appears in the window 17, the pin 23 fits into holes 16 and 24. When the reading 3⅛ appears in the window, the pin fits into holes 16 and 25. Should the reading 3½ appear in the window, the pin fits holes 16 and 26 and if the reading "4" appears in the window, the pin 23 passes through holes 16 and 26, and so forth.

In other words, a mere setting of the plunger within the sleeve, automatically sets the total length of the gauge to correspond with the figure appearing in the window 17.

Thereafter, the gauge is inserted in the cylinder and the thimble 19 rotated, that is screwed outwardly on the sleeve, until the two tips touch the cylinder wall. The gauge is then withdrawn and the micrometer scale 21 is read, and the figure in said scale which is nearest the zero mark 22 indicates or tells the correct size of the oversized piston ring to be ordered for the particular cylinder.

Figure 5:
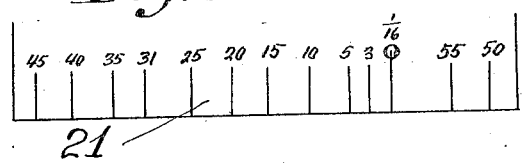
Figure 5 is a diagram illustrating the development of that part of the gauge which refers to the oversize piston rings.

This result is obtained because of the development of the scale 21 as shown in Figure 5, where the gradations in the scale are spaced to indicate the correct size ring with respect to the zero mark, and which gradations further are marked with the actual sizes of oversized piston rings.

If for instance, the figure "10" in the scale 21 appears nearest to the zero mark 22, size "10" is the size ring to be ordered for that particular case.

It will therefore be observed that a gauge according to this invention, is very simple in construction, comprises but few parts and requires very little skill in operation. The gauge is self measuring as to the cylinder diameter and is operated to self-indicate or "tell" the operator, the size of ring required.

Figures 4, 6:
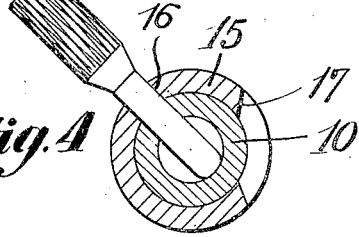
Figure 4 is a sectional view on line 4—4 of Figure 2.
Figure 6 illustrates a modification with parts omitted.

In the modification shown in Figure 6 the relative movement between the plunger and the sleeve is obtained by providing a screw thread 30 on the plunger and threading the sleeve on the inside (not shown). The plunger in this instance is also marked with the standard cylinder diameters 31 and marks 32 to be read with reference to the zero mark 33 on the sleeve. In the instance illustrated in Figure 6, the gauge measures 3¼ inches diameter as will be understood.

Figure 7:
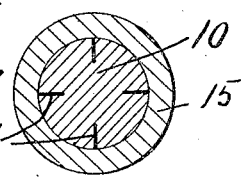
Figure 7 is a transverse sectional view of the gauge illustrating a certain mechanical detail.

The plunger may be solid or hollow. In Figure 7 there is shown a solid plunger 10 provided with saw cuts 34 to provide friction between the plunger and sleeve, so that when once these two parts are set, as by screwing for instance, they will stay set. Similar, or other equivalent means may be used with respect to the thimble 19 and the upper end of sleeve 15, as is obvious.

The tip 20 may be adjusted by a screw driver to compensate for wear and to insure accuracy in the all over length of the gauge.

While I have disclosed my invention in its preferred form, nevertheless, I do not wish to be limited to the exact disclosure as changes and modifications may be made without departing from the principle of the invention and the scope of the appended claims.

I claim:—

1. An instrument for indicating oversize piston rings required for engine cylinders comprising two telescopic members, one of said members having an opening and the other member having marked thereon figures denoting predetermined cylinder diameters and adapted to appear through said opening, means for securing the said members relative to each other after they have been adjusted in length to correspond with any one of the said figures appearing in said opening, means for increasing the length of the instrument to measure the actual diameter of a given cylinder the last named means having indications thereon to show the oversize piston ring required when said instrument is placed in measuring position relatively to a cylinder.

2. An instrument for indicating oversize piston rings required for engine cylinders comprising two relatively slidable members, one of said members having an opening and the other member having marked thereon figures denoting predetermined cylinder diameters and adapted to appear through said opening, means for fixing the adjusted length of the instrument to correspond with any one of the said figures positioned as aforesaid, means for increasing the length of the instrument to measure the actual diameter of a cylinder, the diameter of which has been positioned as aforesaid said last named means having indications thereon to show the oversize piston ring required when said instrument is placed in measuring position relatively to a cylinder.

3. An instrument for indicating oversize piston rings required for engine cylinders comprising two telescopic members, one of said members having an opening and the other member having marked thereon, longitudinally and circumferentially thereof, figures denoting predetermined cylinder diameters and adapted to appear through said opening, means for fixing said members in adjusted relationship to correspond in total length with a given cylinder diameter, means on one of said members for increasing said total length to measure the actual diameter of said given cylinder and a scale on said increasing means indicating the size of the oversize piston ring required when said instrument is placed in measuring position relatively to a cylinder.

4. An instrument for indicating oversize piston rings for standard automobile engine cylinders comprising two members mounted in slidable and rotatable relationship to each other, one of said members having an opening and the other member having marked thereon figures representing standard automobile engine cylinder diameters and adapted to appear through said opening, means for securing the said two members in adjusted relationship to correspond with the figure appearing in the opening, a zero mark on the member having the opening, a measuring member adjustably carried by the last named member, means for adjusting said measuring member with reference to said zero mark and said measuring member having indications thereon to show the oversize piston ring required when said instrument is placed in measuring position relatively to a cylinder, the diameter of which appears in the opening.

5. An instrument of the character described comprising a sleeve having a window and an opening in its side, a plunger rotatably and slidably mounted in said sleeve and provided with figures in predetermined positions indicating standard automobile engine cylinder diameter and provided with a hole adjacent each of said figures, which latter are adapted to appear, one at a time, in said window, a pin for registering the hole in the sleeve with any one of the holes in the plunger to automatically fix the total adjusted length of the said two members equal to the diameter of a cylinder denoted by a figure appearing in said window, a zero mark on said sleeve, a measuring cap on the latter, means for adjusting the cap with respect to said zero mark and a scale of figures on said cap so arranged that the figure in said scale nearest the said zero mark automatically indicates the oversize piston ring required when said instrument is placed in measuring position relatively to a cylinder, whose diameter appears as aforesaid.

Signed at Richmond, Virginia, in the county of Henrico and State of Virginia, this 13th day of August A. D. 1924.

E. EARL PLUMLEY.